US012598142B2

(12) United States Patent
Mula et al.

(10) Patent No.: US 12,598,142 B2
(45) Date of Patent: Apr. 7, 2026

(54) PACKET LOAD-BALANCING

(71) Applicant: MELLANOX TECHNOLOGIES, LTD., Yokneam (IL)

(72) Inventors: Liron Mula, Herzliya (IL); Eran Gil Beracha, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 150 days.

(21) Appl. No.: 18/377,473

(22) Filed: Oct. 6, 2023

(65) Prior Publication Data

US 2025/0119382 A1     Apr. 10, 2025

(51) Int. Cl.
H04L 47/62     (2022.01)
H04L 47/125     (2022.01)
H04L 47/36     (2022.01)

(52) U.S. Cl.
CPC ............ H04L 47/125 (2013.01); H04L 47/36 (2013.01); H04L 47/6225 (2013.01)

(58) Field of Classification Search
CPC ....... H04L 12/56; H04L 47/125; H04L 47/36; H04L 47/6225
See application file for complete search history.

(56) References Cited

U.S. PATENT DOCUMENTS

| | | | | | |
|---|---|---|---|---|---|
| 4,899,335 | A | * | 2/1990 | Johnson, Jr. ........ | H04L 49/1507 370/392 |
| 7,539,750 | B1 | * | 5/2009 | Parker .................... | G06F 15/16 709/224 |

| | | | | | |
|---|---|---|---|---|---|
| 7,821,931 | B2 | * | 10/2010 | Swenson ............. | H04L 45/7453 370/230 |
| 8,325,723 | B1 | * | 12/2012 | Wang .................... | H04L 49/254 370/235 |
| 8,363,668 | B2 | * | 1/2013 | Thomas ................ | H04L 47/527 370/412 |
| 8,588,239 | B2 | * | 11/2013 | Nakagawa ............. | H04L 47/10 370/401 |
| 8,644,327 | B2 | * | 2/2014 | Benner .............. | H04Q 11/0478 370/429 |
| 8,943,236 | B1 | * | 1/2015 | Usmani .............. | H04L 12/6418 710/21 |
| 10,331,569 | B2 | * | 6/2019 | Florea ..................... | G06F 12/10 |
| 11,075,847 | B1 | * | 7/2021 | Kwan ..................... | H04L 47/11 |
| 11,310,164 | B1 | * | 4/2022 | Korman ............. | H04L 47/6215 |
| 11,632,326 | B1 | * | 4/2023 | Hegar .................... | H04L 45/28 709/238 |
| 12,218,841 | B1 | * | 2/2025 | Shalev .................... | H04L 69/16 |

(Continued)

*Primary Examiner* — Chris Parry
*Assistant Examiner* — Hassan Abdur-Rahman Khan
(74) *Attorney, Agent, or Firm* — Sheridan Ross P.C.

(57)     ABSTRACT

A device, communication system, and method are provided. In one example, a system for routing traffic is described that includes circuits to receive a packet, determine a size of the packet, determine a group of a plurality of groups of the packet based on the size of the packet, determine a port for the packet using a round-robin for the group of the packet, and send the packet via the port. Described systems include circuits to receive packet sizes from an application, initialize packet arbiter circuits based on the sizes, receive a packet associated with the application, determine a size of the packet, associate the packet with one of the packet arbiter circuits, and route the packet to a selected port.

20 Claims, 5 Drawing Sheets

(56)     References Cited

U.S. PATENT DOCUMENTS

| | | | | |
|---|---|---|---|---|
| 2002/0110134 A1* | 8/2002 | Gracon | H04L 47/20 | 370/235 |
| 2002/0114327 A1* | 8/2002 | Mononen | H04L 9/40 | 370/389 |
| 2002/0122424 A1* | 9/2002 | Kawarai | H04L 49/9094 | 370/412 |
| 2003/0137936 A1* | 7/2003 | Cornet | H04L 49/258 | 370/230 |
| 2003/0214948 A1* | 11/2003 | Jin | H04L 47/2441 | 370/392 |
| 2005/0135350 A1* | 6/2005 | Noirie | H04L 49/3081 | 370/386 |
| 2007/0002880 A1* | 1/2007 | Chien | H04L 49/90 | 370/465 |
| 2007/0237074 A1* | 10/2007 | Curry | H04L 47/326 | 370/229 |
| 2008/0080382 A1* | 4/2008 | Dahshan | H04L 45/56 | 370/235 |
| 2009/0147793 A1* | 6/2009 | Hayakawa | H04L 45/04 | 370/401 |
| 2009/0262748 A1* | 10/2009 | Nakagawa | H04L 12/4641 | 370/412 |
| 2011/0085464 A1* | 4/2011 | Nordmark | H04L 47/32 | 370/252 |
| 2011/0149977 A1* | 6/2011 | Thomas | H04L 47/527 | 370/395.41 |
| 2011/0292795 A1* | 12/2011 | Johnson | H04L 47/6255 | 370/230 |
| 2016/0191424 A1* | 6/2016 | Srinivasan | H04L 49/3045 | 370/359 |
| 2017/0048145 A1* | 2/2017 | Shiraki | H04L 47/52 | |
| 2019/0013841 A1* | 1/2019 | Hassan | H01Q 21/06 | |
| 2019/0028342 A1* | 1/2019 | Kommula | H04L 45/24 | |
| 2021/0092058 A1* | 3/2021 | Popilov | H04L 45/566 | |
| 2021/0377161 A1* | 12/2021 | Li | H04L 45/30 | |
| 2022/0217073 A1* | 7/2022 | Roweth | H04L 45/02 | |
| 2023/0155964 A1* | 5/2023 | Henry | H04L 47/125 | 370/412 |
| 2025/0039071 A1* | 1/2025 | Seto | H04L 41/16 | |
| 2025/0080784 A1* | 3/2025 | Oura | H04N 21/251 | |

* cited by examiner

PACKET LOAD-BALANCING

FIELD OF THE DISCLOSURE

The present disclosure is generally directed toward networking and, in particular, toward networking devices, switches, and methods of operating the same.

BACKGROUND

Switches and similar network devices represent a core component of many communication, security, and computing networks. Switches are often used to connect multiple devices, device types, networks, and network types.

Devices including but not limited to personal computers, servers, or other types of computing devices, may be interconnected using network devices such as switches. These interconnected entities form a network that enables data communication and resource sharing among the nodes. Often, multiple potential paths for data flow may exist between any pair of devices. This feature, often referred to as multipath routing, allows data, often encapsulated in packets, to traverse different routes from a source device to a destination device. Such a network design enhances the robustness and flexibility of data communication, as it provides alternatives in case of path failure, congestion, or other adverse conditions. Moreover, it facilitates load balancing across the network, optimizing the overall network performance and efficiency. However, managing multipath routing and ensuring optimal path selection can pose significant challenges, necessitating advanced mechanisms and algorithms for network control and data routing, and power consumption may be unnecessarily high, particularly during periods of low traffic.

BRIEF SUMMARY

In accordance with one or more embodiments described herein, a computing system, such as a switch, may enable a diverse range of systems, such as switches, servers, personal computers, and other computing devices, to communicate across a network. Ports of the computing system may function as communication endpoints, allowing the computing system to manage multiple simultaneous network connections with one or more nodes.

Each port of the computing system may be considered a lane and may be associated with an egress queue of data, such as in the form of packets, waiting to be sent via the port. In effect, each port may serve as an independent channel for data communication to and from the computing system. Each port of the computing system may be connected to one or more ports of one or more other computing systems. Ports allow for concurrent network communications, enabling the computing system to engage in multiple data exchanges with different network nodes simultaneously.

Load balancing of network traffic between multiple paths is conventionally a computationally difficult task. Consider a network switch receiving packets from one or more sources. Each packet flowing through the switch is associated with a particular destination. In simple topologies, there may be a single port of the switch which the packet must be sent from to reach the destination. However, in modern network topologies, such as clusters of graphics processing units (GPUs) used for artificial intelligence (AI) related tasks, there may be many possible ports from which a packet may be transmitted to reach an associated destination. As a result, a decision must be made as to which one of many possible ports should transmit each packet due to the existence of multiple paths in the network.

A goal of a switch in such a scenario in many applications is to route packets toward a destination in such a way as to provide maximal total throughput and avoiding congestion.

As an example, consider two packets A and B being received by a switch S1. Packet A is targeted at a destination node X and packet B is targeted to a destination node Y. Switch S1 is connected to two other switches, S2 and S3. Switch S2 is connected to destination nodes X and Y, while switch S3 is connected to destination node X but not destination node Y.

To reach destination node X, packet A can be sent from S1 to S2 or S3. To reach destination node Y, packet B must be sent from S1 to S2. If both packets A and B are sent to their respective destinations from S1 to S2, a congestion may occur at S2 while S3 may be under-utilized. Also, if only one port connects S1 to S2, that port may be over-used while other ports remain unused. In such a scenario, one of the packets A and B may be delayed in reaching its respective destination. If, instead, packet A is sent from S1 to S3 and packet B from S1 to S2, then the packets may arrive at their respective destination without delay and without causing any congestion.

Networking algorithms may be used for achieving maximal throughput in the existence of multiple paths. For example, adaptive routing may be used to spread packets evenly between all available paths, while employing a control loop that monitors each path's occupancy. If the occupancy of any path becomes negative (meaning a queue of packets waiting to be transmitted has formed for that path), the path may be removed from a list of available paths until the congestion has been resolved.

Such an adaptive routing algorithm requires a control loop to detect an over-subscribed path to reduce the number of packets sent to the over-subscribed path. Such reliance on a control loop results in queues forming and packets reaching destinations with higher latencies than other packets. Such latency may be described as latency jitter.

Latency jitter causes application performance degradation. For example, an application may send multiple streams of data to multiple targets and wait until all the responses return from the targets. In such an application, latency jitter may cause the application to sit at idle instead of progressing in execution of a process.

As described herein, a method of spreading packets between available interfaces, such that queues in switches can be avoided without relying on any control loop or adaptive routing algorithm.

Packets transmitted by an application may be in different sizes.

However, while packets can be in any possible size, such as in some implementations any number of bytes between 64 and 12,000, packet sizes may not be uniformly distributed between all possibilities. Instead, each application may use a limited number of packet sizes.

For example, ROCE, the network protocol for large GPU clusters, uses two distinct packet sizes. Around eighty percent of the packets are four kilobytes, and the remaining twenty percent of the packets are eighty bytes in size.

When such an application communicates via a switch, the switch may distribute the packets evenly across all available paths, such as using a round-robin mechanism. Using such a mechanism, it may be possible that one path may receive an excessive number of larger packets while another path may receive fewer larger packets and more small packets. As a result, the path with the larger packets may experience congestion, resulting in latency jitter.

However, using a system or method as described herein, a routing of packets may be performed based at least in part on the size of packets. In some implementations, a packet size classifier circuit may be used to classify ingress packets based on packet sizes. Based on the classifications, each ingress packet may be assigned to a particular arbiter circuit. When a packet arrives at the system, the packet may be classified to a packet-size-group. Each packet size group may be associated with a dedicated arbiter. When a packet is classified to a packet size group, the packet may be directed to a port by the associated arbiter. For example, a packet assigned to packet size group 1 may be routed by an arbiter 1 while a packet assigned to packet size group 2 may be routed by an arbiter 2. Using such a system, as described in greater detail herein, no one path will receive an excessive number of larger or smaller packets. Each available path will receive roughly the same bandwidth of data, minimizing packet jitter of packets over the paths.

Each arbiter, as described below, may be a round-robin arbiter configured to route packets to ports in a repetitious order, starting from an initial port and proceeding through each of the other ports before wrapping back around to the initial port.

In some implementations, the packet size grouping may be determined on-the-fly or based on data from an application as described in greater detail herein.

The present disclosure describes a system and method for enabling a switch or other computing system to route packets to one or more ports based on the size of the packets. Embodiments of the present disclosure aim to solve the above-noted shortcomings and other issues by implementing an improved routing approach. Systems and methods as described herein reduce latency jitter and other issues arising from data congestion.

The routing approach depicted and described herein may be applied to a switch, a router, or any other suitable type of networking device known or yet to be developed. In an illustrative example, a system is disclosed that includes circuits to provide routing of packets. Such circuits may be capable of receiving a packet, determining a size of the packet, determining a group of a plurality of groups of the packet based on the size of the packet, determining a port for the packet using a round-robin for the group of the packet, and sending the packet via the port.

In another example, a system is disclosed that includes one or more circuits to receive a plurality of packet sizes from an application; initialize a plurality of packet arbiter circuits, wherein each packet arbiter circuit is associated with one of the plurality of packet sizes; receive a first packet associated with the application; determine a size of the packet; based on the determined size of the packet, associate the packet with one of the packet arbiter circuits; select, with the associated packet arbiter circuit, a port of a plurality of ports; and route the packet to the selected port of the plurality of ports.

In yet another example, a switch is disclosed that includes one or more circuits to receive a packet; match a size of the packet to a packet size category; based on the packet size category matching the size of the packet, determine a port for the packet using a round-robin associated with the packet size category of the packet; and send the packet via the port.

Any of the above example aspects include wherein the one or more circuits are further to: receive application data from application; and create the plurality of groups based on the application data.

Any of the above example aspects include wherein the packet is received from the application.

Any of the above example aspects include wherein the application data comprises a set of packet sizes.

Any of the above example aspects include wherein creating the plurality of groups comprises creating a group for each packet size of the set of packet sizes.

Any of the above example aspects include wherein determining the group of the packet comprises determining the size of the packet matches one of the plurality of packet sizes from the application.

Any of the above example aspects include wherein the one or more circuits are further to initiate a round-robin for each group of the plurality of groups.

Any of the above example aspects include wherein the one or more circuits comprise a plurality of routing circuits, wherein each routing circuit is associated with a respective one of the groups.

Any of the above example aspects include wherein determining the size of the packet comprises reading a field of the packet.

Any of the above example aspects include wherein the one or more circuits are further to append the packet with one or more bits identifying the group of the packet.

Any of the above example aspects include wherein initializing the plurality of packet arbiter circuits comprises setting a start point for each of the packet arbiter circuits.

Any of the above example aspects include wherein the start point for each of the packet arbiter circuits is set randomly or with a linear feedback shift register (LFSR).

Any of the above example aspects include wherein determining the size of the packet comprises determining the size of the packet matches one of the plurality of packet sizes from the application.

Any of the above example aspects include wherein determining the size of the packet comprises reading a field of the packet.

Any of the above example aspects include wherein the one or more circuits are further to: receive a plurality of packets; determine a size of each of the packets; based on the determined size of each of the packets, associate each of the packets with one of the packet arbiter circuits; select, with the associated packet arbiter circuit, a port of a plurality of ports for each of the packets; and route each of the packets to the selected port of the plurality of ports for each of the packets.

Any of the above example aspects include wherein the packet size category is one of a plurality of packet size categories and the one or more circuits are further to: receive application data from application; and create the plurality of packet size categories based on the application data.

Any of the above example aspects include wherein the packet is received from the application.

Any of the above example aspects include wherein the application data comprises a set of packet sizes.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
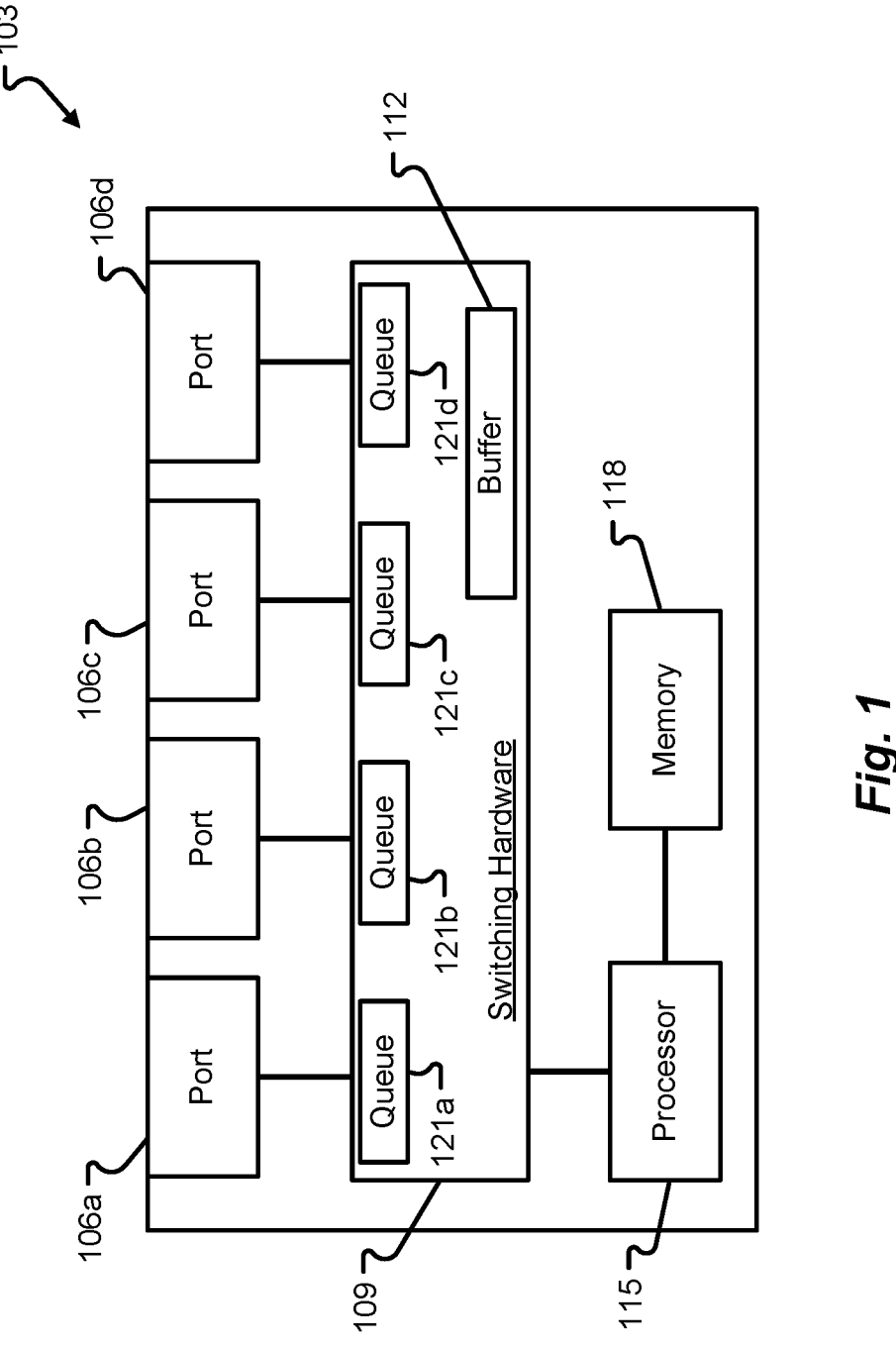
FIG. 1 is a block diagram depicting an illustrative configuration of a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It is understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably, and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-7, various systems, and methods for routing packets between communication nodes will be described. The concepts of packet routing depicted and described herein can be applied to the routing of information from one computing device to another. The term packet as used herein should be construed to mean any suitable discrete amount of digitized information. The information being routed may be in the form of a single packet or multiple packets without departing from the scope of the present disclosure. Furthermore, certain embodiments will be described in connection with a system that is configured to make centralized routing decisions whereas other embodiments will be described in connection with a system that is configured to make distributed and possibly uncoordinated routing decisions. It should be appreciated that the features and functions of a centralized architecture may be applied or used in a distributed architecture or vice versa.

In accordance with one or more embodiments described herein, a computing system 103 as illustrated in FIG. 1 may enable a diverse range of systems, such as switches, servers, personal computers, and other computing devices, to communicate across a network. Such a computing system 103 as described herein may for example be a switch or any computing device comprising a plurality of ports 106*a-d* for connecting with nodes on a network.

The ports 106*a-d* of the computing system 103 may function as communication endpoints, allowing the computing system 103 to manage multiple simultaneous network connections with one or more nodes. Each port 106*a-d* may be used to transmit data associated with one or more flows. Each port 106*a-d* may be associated with a queue 121*a-d* enabling the port 106*a-d* to handle incoming and outgoing data packets associated with flows.

Each port 106*a-d* of the computing system may be considered a lane and be associated with a respective egress queue 121*a-d* of data, such as in the form of packets, waiting to be sent via the port 106*a-d*. In effect, each port 106 may serve as an independent channel for data communication to and from the computing system 103. Ports 106 allow for concurrent network communications, enabling the computing system 103 to engage in multiple data exchanges with different network nodes simultaneously. As a packet or other form of data becomes ready to be sent from the computing system 103, the packet may be assigned to a port 106 from which the packet will be sent by being stored in a queue 121 associated with the port 106.

The ports 106*a-d* of the computing system 103 may be physical connection points which allow network cables such as Ethernet cables to connect the computing system 103 to one or more network nodes. Each port 106*a-d* may be of a different type, including, for example, a 100 Mbps, 1000 Mbps, or 10-Gigabit Ethernet ports, each providing different levels of bandwidth.

Packets received, created, or otherwise handled by the computing system 103 to be transmitted from the computing system 103 may be associated with a particular destination.

Because each port 106*a-d* may be used to send a particular packet, when a packet is received, created, or otherwise handled by the computing system 103 and is to be transmitted from the computing system 103, one or more ports 106*a-d* of a computing system 103 may be selected to transmit the packet. Transmitting a packet from a port 106*a-d* may comprise, as described in greater detail below, placing the data in a queue 121*a-d* associated with the other port 106*a-d*.

Switching hardware 109 of the computing system may comprise an internal fabric or pathway within the computing system 103 through which data travels between two ports 106*a-d*. The switching hardware 109 may in some embodiments comprise one or more network interface cards (NICs). For example, in some embodiments, each port 106*a-d* may be associated with a different NIC. The NIC or NICs may comprise hardware and/or circuitry which may be used to transfer data between ports 106*a-d*.

Switching hardware 109 may also or alternatively comprise one or more application-specific integrated circuits (ASICs) to perform tasks such as determining to which port a received packet should be sent. The switching hardware 109 may comprise various components including, for example, port controllers that manage the operation of individual ports, network interface cards that facilitate data transmission, and internal data paths that direct the flow of data within the computing system 103. The switching hardware 109 may also include memory elements to temporarily store data and management software to control the operation of the hardware. This configuration could enable the switching hardware 109 to accurately track port usage and provide data to the processor 115 upon request.

Packets received by the computing system 103 may be placed in a buffer 112 until being placed in a queue 121*a-d* before being transmitted by a respective port 106*a-d*. The buffer 112 may effectively be an ingress queue where received data packets may temporarily be stored. As described herein, the ports 106*a-d* via which a given packet is to be sent may be determined based on a number of factors.

As illustrated in FIG. 1, the computing system 103 may also comprise a processor 115, such as a CPU, a microprocessor, or any circuit or device capable of reading instructions from memory 118 and performing actions. The processor 115 may execute software instructions to control operations of the computing system 103.

The processor 115 may function as the central processing unit of the computing system 103 and execute the system's operative capabilities. Processor 115 communicates with other components of the computing system 103 to manage and perform computational operations, ensuring optimal system functionality and performance.

In further detail, the processor 115 may be engineered to perform a wide range of computational tasks. Its capabilities may encompass executing program instructions, managing data within the system, and controlling the operation of other hardware components such as switching hardware 109. The processor 115 may be a single-core or multi-core processor and might include one or more processing units, depending on the specific design and requirements of the computing system 103. The architectural design of the processor 115 may allow for efficient instruction execution, data processing, and overall system management, thereby enhancing the computing system 103's performance and utility in various applications. Furthermore, the processor 115 may be programmed or adapted to execute specific tasks and operations according to application requirements, thus potentially enhancing the versatility and adaptability of the computing system 103.

The computing system 103 may further comprise one or more memory 118 components. Memory 118 may be configured to communicate with the processor 115 of the computing system 103. Communication between memory 118 and the processor 115 may enable various operations, including but not limited to, data exchange, command execution, and memory management.

The memory 118 may be constituted by a variety of physical components, depending on the specific type and design. At the core, memory 118 may include one or more memory cells capable of storing data in the form of binary information. These memory cells may be made up of transistors, capacitors, or other suitable electronic components depending on the memory type, such as DRAM, SRAM, or Flash memory. To enable data transfer and communication with other parts of the computing system 103, memory 118 may also include data lines or buses, address lines, and control lines. Such physical components may collectively constitute the memory 118, contributing to its capacity to store and manage data.

Data stored in memory 118 may encompass information about various aspects of port, buffer, and system usage. Such information might include data about active connections, amount of data in queues 121*a-d*, amount of data in the buffer 112, statuses of each port within the ports 106*a-d*, among other things. Data may include, for example, buffer-occupancy, a number of active ports 106*a-d*, a number of total ports 106*a-d*, and a queue depth or length for each port 106*a-d*, as described in greater detail herein. The data may be stored, accessed, and utilized by the processor 115 in managing port operations and network communications. For example, the processor 115 might utilize the data in memory 118 to manage network traffic, prioritize, or otherwise control the flow of data through the computing system 103 as described in greater detail herein. Therefore, the memory 118, in potential conjunction with the processor 115, may play a crucial role in optimizing the usage and performance of the ports 106 of the computing system 103.

Data stored in memory 118 may include various metrics such as amount of data or a number of packets in each queue 121*a-d*, an amount of data or a number of packets in the buffer 112, and/or other information, such as data transmission rates, error rates, and status of each port. The processor 115, after receiving this data, might perform further operations based on the obtained information, such as optimizing port usage, balancing network load, or troubleshooting issues, as described herein.

Figure 2:
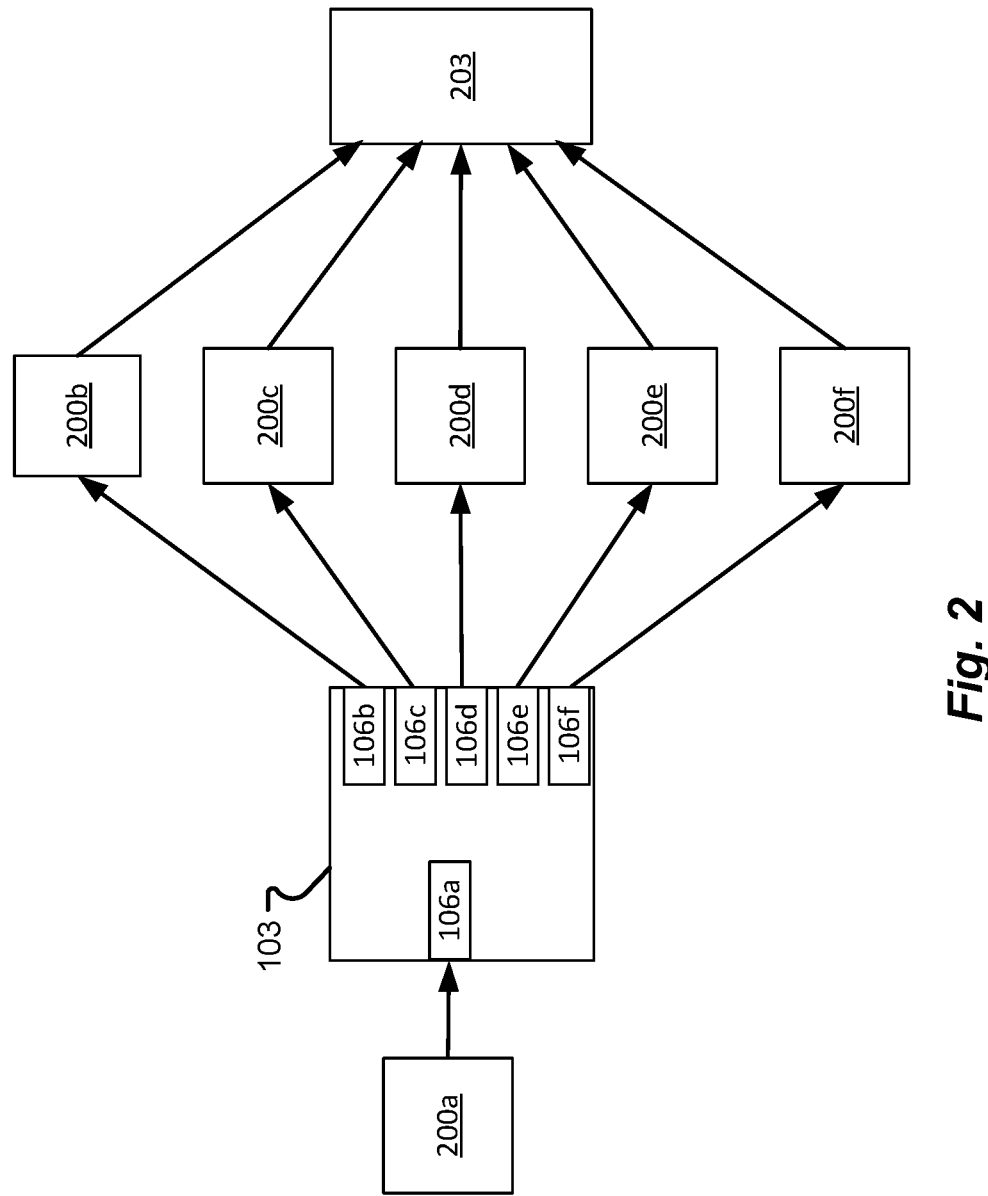
FIG. 2 illustrates a network of a computing system and nodes in accordance with at least some embodiments of the present disclosure.

In one or more embodiments of the present disclosure, a computing system 103, such as a switch, may be in communication with a plurality of network nodes 200*a-f* as illustrated in FIG. 2. Each network node 200*a-f* may be a computing system with capabilities for sending and receiving data. Each node 200*a-f* may be any one of a broad range of devices, including but not limited to switches, personal computers, servers, or any other device capable of transmitting and receiving data in the form of packets. Via the nodes 200*a-f*, the computing system 103 may be capable of communicating with distant systems such as a destination device 203. It should be appreciated that a destination device 203 may be directly connected to the computing system 103 via one or more ports 106*a-f* without any intermediary nodes 200*b-f*.

In some implementations, packets sent from a node 200*a* may originate at an application. For example, a node 200*a* may be a computing system executing one or more applications which communicate with a destination device 203 via one or more other nodes 200*b-f* connected to the computing system 103 via a port 106*b-f*.

In some implementations, packets sent from the computing system 103 may originate within the computing system 103. For example, the computing system 103 may execute one or more applications which communicate with a destination device 203 via one or more nodes 200*a-f* connected to the computing system 103 via a port 106*a-f*.

The computing system 103 may establish communication channels with the network nodes 200*a-f* via the ports 106*a-f*. Such channels may support data transfer in the form of flows of packets, following predetermined protocols that govern the format, size, transmission method, and other aspects of the packets.

Each network node 200*a-f* may interact with the computing system 103 in various ways. A node 200 may send data packets to the computing system 103 for processing, transmission, or other operations, or for forwarding to another node 200. Conversely, each node 200 may receive data from the computing system 103, originating from either the computing system 103 itself or other network nodes 200*a-f* via the computing system 103. In this way, the computing system 103 and nodes 200*a-f* could collectively form a network, facilitating data exchange, resource sharing, and a host of other collaborative operations.

Nodes 200*a-f* may be connected to a plurality of computing systems 103, 203 as described herein forming a network of nodes 200*a-f* and computing systems 103, 203. For example, the systems and methods described herein may comprise a plurality of interconnected switches. Multiple computing systems 103, 203, such as switches, can be interconnected in a variety of topologies, such as star, ring, or mesh, depending upon the specific requirements and resilience needed for the network. For instance, in a star topology, a plurality of switches may be connected to a central switch, whereas in a ring topology, each switch may be connected to two other switches in a closed loop. In a mesh topology, each switch may be interconnected with every other switch in the network.

While computing system 103 is illustrated as being connected to the computing system 203 via nodes 200*b-f*, it should be appreciated the separating nodes 200*b-f* may be omitted and the computing systems 103, 203 may be directly interconnected via any number of ports 106*b-f* of the computing system 103.

Integrating multiple ports of a first computing system 103 with a second computing system 203, as opposed to using a single port connection, offers a range of benefits, most prominently increased bandwidth and redundancy. The aggregation of multiple connections between the two switches effectively increases the available data pipeline size, allowing for greater throughput. This is particularly useful in high-demand environments where data traffic is substantial. Furthermore, establishing multiple connections enhances network resilience. If one connection fails, the network can continue operating as usual, utilizing the remaining active connections.

In the example illustrated in FIG. 2, node 200*a* is connected to port 106*a* of computing system 103, node 200*b* is connected to port 106*b* of computing system 103 and to the destination device 203, node 200*c* is connected to port 106*c* of computing system 103 and to the destination device 203, node 200*d* is connected to port 106*d* of computing system 103 and to the destination device 203, node 200*e* is connected to port 106*e* of computing system 103 and to the destination device 203, and node 200*f* is connected to port 106*f* of computing system 103 and to the destination device 203. As a result, the computing system 103 can communicate with the destination device 203 via any of nodes 200*b-f*. For example, the computing system 103 may use any of ports 106*b-f* to send a packet from node 200*a* to the destination device 203.

Not every port 106*a-f* of a computing system 103 may be used to communicate with every node in a network. As such, ports can be considered as being a part of one or more groups of ports based on the nodes which can be served via the respective port. Because there may be multiple paths for data to follow to get to a particular destination, one or more ports of a computing system 103 can be chosen to send a particular packet without degrading the flow of data.

Figures 3, 4:
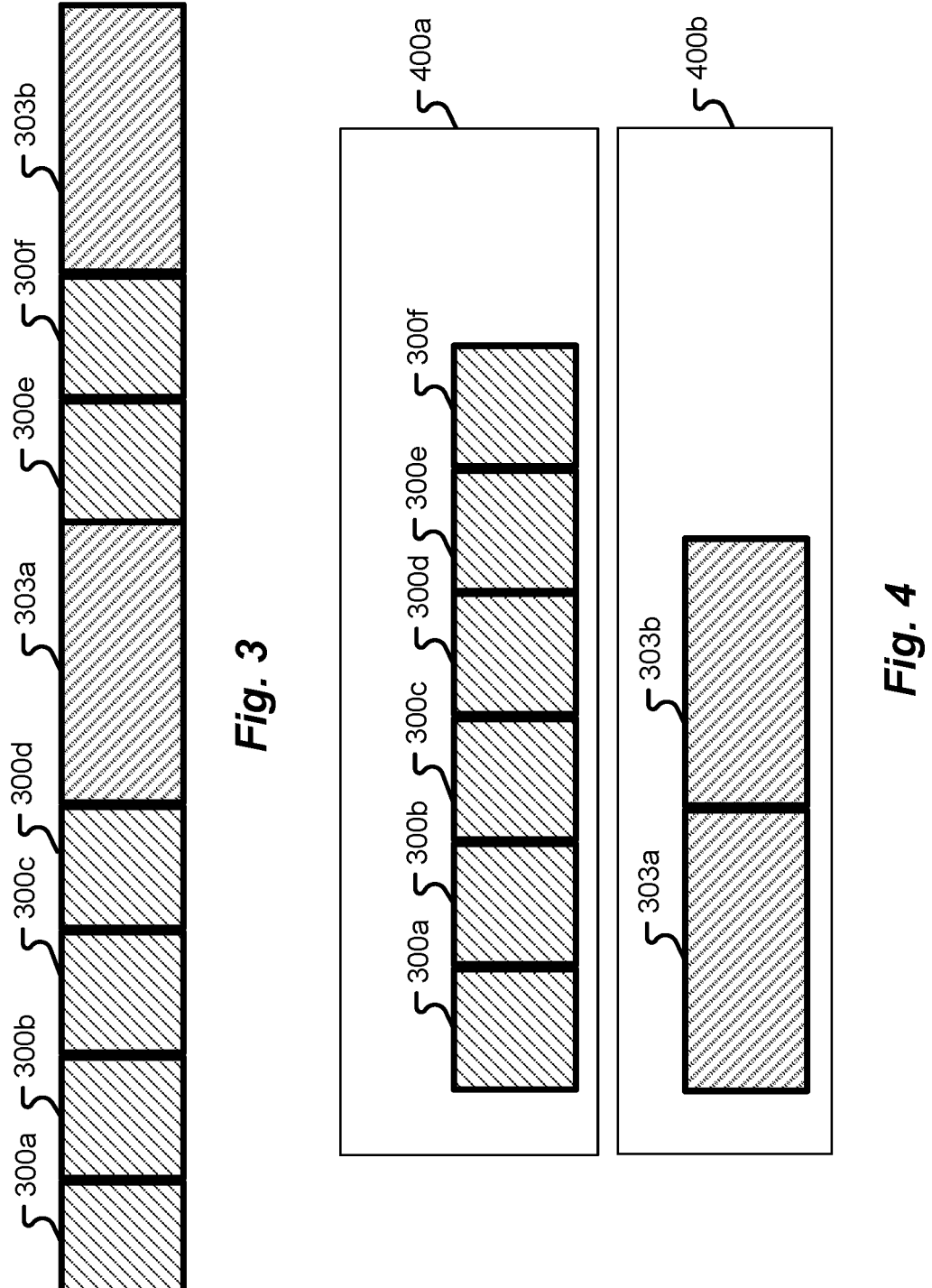
FIG. 3 illustrates a plurality of packets in accordance with at least some embodiments of the present disclosure.
FIG. 4 illustrates a plurality of packets and arbiters in accordance with at least some embodiments of the present disclosure.

FIG. 3 illustrates packets 300*a-f*, 303*a-b* as may be transmitted by a computing system 103. Such packets 300*a-f*, 303*a-b* may be generated by an application executing on the computing system 103 or on a device in communication with the computing system 103. In the example illustrated in FIG. 3, the packets 300*a-f*, 303*a-b* include a first set of packets 300*a-f* of a first size and a second set of packets 303*a-b* of a second size. The packets 300*a-f* of the first size are smaller than the packets 303*a-b* of the second size. As an application executes, the application may generate packets of many sizes in any order. A size of a packet as described herein may be measured in bits or bytes. The size of a packet may depend on, for example, a size of a payload of the packet. For example, packets generated by an application may include various sizes of payloads.

FIG. 4 illustrates the packets 300*a-f*, 303*a-b* grouped by sizes and assigned to arbiters 400*a-b*. As packets 300*a-f*, 303*a-b* are handled by a computing system 103 to be sent from the computing system 103 via one or more ports 106*a-f*, each packet 300*a-f*, 303*a-b* may be classified based on size and may be assigned to a particular arbiter 400*a-b* based on the classification. For example, packets of a first size may be assigned to a first arbiter and packets of a second size may be assigned to a second arbiter.

An arbiter as described herein may be a hardware device or a software process. When a packet is assigned to an arbiter, the arbiter may select a port to send the packet. For example, an arbiter may be a routing circuit designed to direct a packet to a particular port.

In some implementations, each arbiter may execute a round-robin. A round-robin executed by an arbiter may begin with an initial start point port. Initializing an arbiter may include setting a start point for the arbiter. In some implementations, the start point for each of the packet arbiter circuits may be set randomly or with a linear feedback shift register (LFSR).

A first packet routed by an arbiter may be sent via the start point port. A second packet routed by the arbiter may be sent via a next port after the start point port. For example, an arbiter designed to send packets via ports 1-4 may use port 2 as a start point. The arbiter may send packets to ports in the following order: 2, 3, 4, 1, 2, 3, 4, etc.

A computing system as described herein may include a number of arbiters. Each arbiter may be associated with a different start point port. Each arbiter may be associated with a different group of packets. Each group of packets may be associated with a different packet size.

In some implementations, the different packet sizes may be determined based on information from an application. For example, a computing system may receive application data from an application. The application data may include a set of packet sizes. Based on the packet sizes received from the application, the computing system may create a group for each packet size and may initialize an arbiter for each group. For example, an application may inform the computing system to expect packets of three different sizes. In response, the computing system may initiate three arbiters and associate each arbiter with one of the three different sizes. When a packet is received, a classifier circuit may determine a size of the packet and assign the packet to an arbiter based on the determined size. The assigned arbiter may route the packet to a particular queue or port using, for example, a round-robin mechanism.

Figure 5:
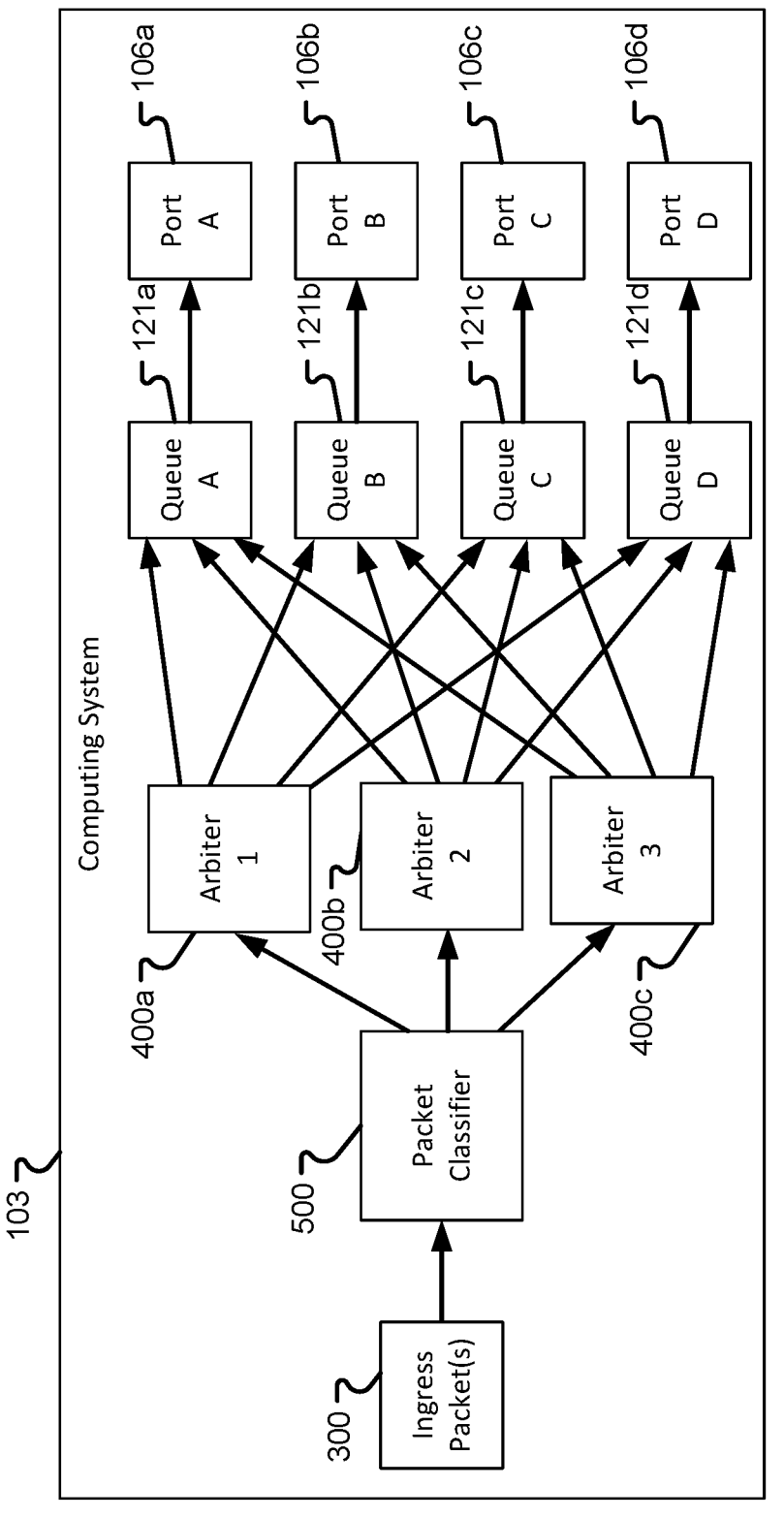
FIG. 5 illustrates a packet routed to a queue in accordance with at least some embodiments of the present disclosure.

As illustrated in FIG. 5, a computing system may include a packet classifier circuit 500 and a plurality of arbiter circuits 400a-c. The packet classifier circuit 500 may be configured to receive an ingress packet 300 and assign the packet 300 to one of the plurality of arbiter circuits 400a-c. The ingress packet 300 may be a packet received by the computing system 103 or may be a packet generated by the computing system 103.

Upon being assigned a packet 300, an arbiter 400a-c may assign the packet 300 to a port 106a-d and may write the packet 300 to a queue 121a-d associated with the assigned port 106a-d or cause the packet 300 to be written to the queue 121a-d associated with the assigned port 106a-d. This process may be as described in greater detail below in relation to the methods 600 and 700 of FIGS. 6 and 7.

Figure 7:
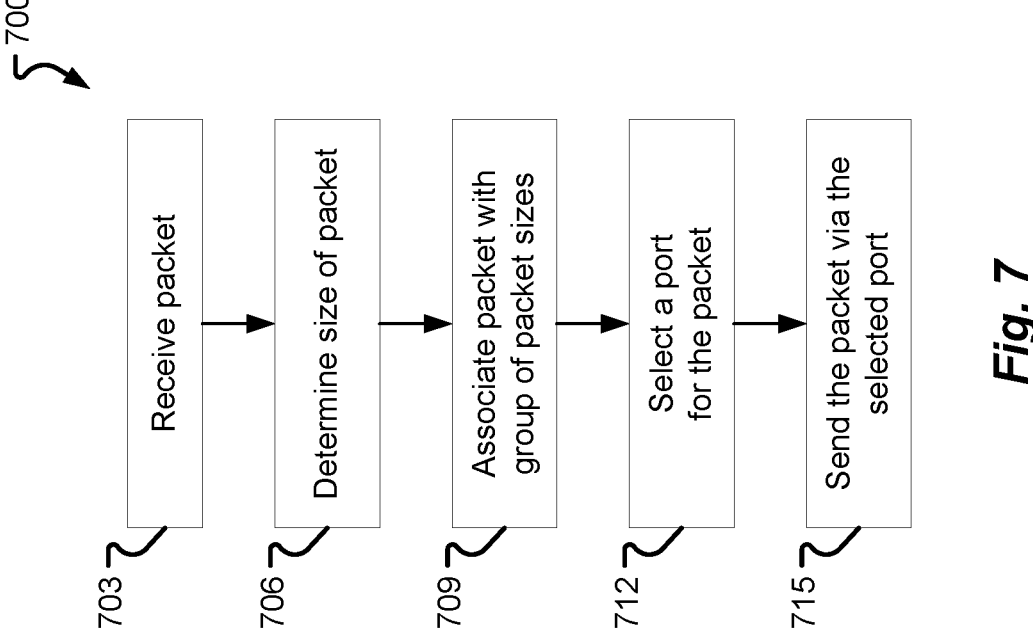
FIG. 7 is a flow diagram depicting a method in accordance with at least some embodiments of the present disclosure.
Figure 6:
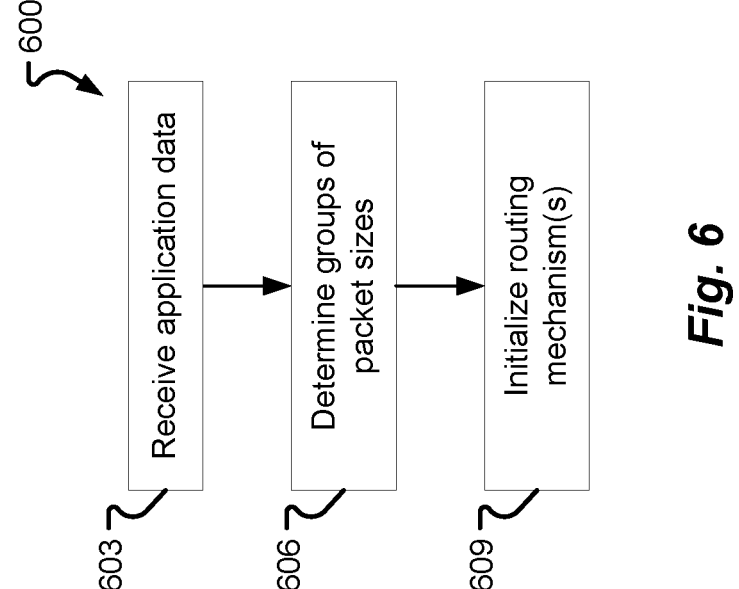
FIG. 6 is a flow diagram depicting a method in accordance with at least some embodiments of the present disclosure.

As illustrated in FIG. 6, and in accordance with a computing system 103 as illustrated in FIGS. 1, 2, and 5, and as described herein, a method 600 may be performed to initialize routing mechanisms within the computing system 103. Routing mechanisms as described herein may include one or more of packet classifier circuits and arbiters such as illustrated in FIG. 5. As illustrated in FIG. 7, and in accordance with a computing system 103 as illustrated in FIGS. 1, 2, and 5, and as described herein, a method 700 may be performed to send a packet via a particular port of the computing system 103 based on a size of the packet using routing mechanisms within the computing system 103. While the description of the methods 600 and 700 provided herein describes steps of the methods 600 and 700 as being performed by a processor 115 of the computing system 103, the steps of the methods 600 and 700 may be performed by one or more processors 115, switching hardware 109, one or more controllers, one or more circuits in the computing system 103, or some combination thereof. As should be appreciated, the methods 600 and 700 may be implemented through hardware or software. As a result of the methods 600 and 700, based on a size of a packet, the packet may be sent via a particular port in such a way as to avoid packet jitter.

Because multiple applications may use a computing system 103 to send data, the initialization of routing mechanisms as described in the method 600 may be implemented for a number of different applications and may be performed separately for each application. For example, the method 600 may be performed in parallel for each application or may be performed in series for each application.

As a result of executing the method 600 for each of a plurality of applications, a number of groups of routing mechanisms may be initialized and used to route packets. For example, packets from a first application may be routed using a first set of routing mechanisms and packets from a second application may be routed using a second set of routing mechanisms.

At 603, the method 600 may begin with a processor 115 of a computing system 103 receiving application data. Application data may be received from an application executing within the computing system 103 or from an application executing on a computing system in communication with the computing system 103. In some implementations, application data may be received from a user such as via a user input device. For example, a user may interact with a graphical user interface (GUI) to select one or more packet sizes which may be expected to be sent via the computing system 103.

From the application data, the processor 115 may be configured to identify packet sizes which may be expected to be sent via the computing system 103. In some implementations, the packet sizes may be distinct values, such as a number of bits or bytes, or may be ranges of sizes, such as ranges of bits or bytes. In some implementations, the application data may include the packet sizes while in other implementations, the packet sizes may be determined based on the application data.

In some implementations, the packet sizes may be determined over time as data from an application is transmitted from the computing system. For example, the computing system may communicate data on behalf of an application and may monitor the sizes of packets sent for the application. A determination may be made as to whether a limited number of distinct packet sizes can be identified. For example, the computing system may detect that packets associated with a particular application are always or often in one of N numbers of packet sizes. Based on that determination, the computing system may identify the N numbers of packet sizes.

At 606, the method 600 may comprise determining a number of buckets or groups of packet sizes. Determining the number of buckets or groups of packet sizes may involve analyzing the application data received at 603 to determine a set of packet sizes for which packets may be expected to be transmitted from the computing system 103 for the application. For example, an application may generate packets in three different sizes, 64 bytes, 128 bytes, and 256 bytes. The application or a user may provide data relating to the three different sizes to the computing system 103. Based on the different sizes, the computing system may determine there are three different buckets or groups of packet sizes for packets associated with the application.

At 609, the method 600 may comprise initializing a packet arbiter circuit for each of the buckets or groups of packet sizes. In some implementations, initializing the arbiter circuits may comprise setting a round-robin start point for each arbiter circuit and initiating the round-robin. As described above, the round-robin start point of each arbiter circuit may be set to a random port or a port using a linear feedback shift register (LFSR).

The method 600 may also comprise configuring a classifier circuit to process received packets by determining a size of each received packet and assigning each received packet to an arbiter circuit based on the determined size. In some implementations, the classifier circuit may inspect a header, payload, and/or other sections of each packet to ascertain the size or length of the data it contains. For example, the classifier circuit may inspect an IP.Length field of each packet. Upon the determination of a packet's size, the classifier circuit may then associate each packet with a specific arbiter circuit based on the determined size.

At the end of the method 600, the computing system may be configured to receive packets, to determine a size of each packet, based on the size of each packet, assign the packet to a particular arbiter circuit, and to route the received packet from the computing system via a particular port selected by the particular arbiter circuit. Such a system of routing packets may be as described below in relation to the method 700 of FIG. 7.

The method 700 may begin at 703, when a computing system receives a packet to be sent from the computing system. Receiving a packet as described herein may include the computing system generating the packet, such as during execution of an application or process in which packets are generated, or receiving a packet from various sources, including applications running on computing devices connected to the computing system. For example, a packet may be received which originated at an application hosted on a server, workstation, or any other computing device intending to send data to another device or network via the computing system. In some implementations, the packet may be one of a continuous or semi-continuous stream of data packets originating from various sources, such as applications running on connected devices.

At 706, upon receipt by the computing system, the packet may be intercepted by input circuitry such as the switching hardware 109. The computing system may then read the header and/or other portions of the packet to identify pertinent details such as the destination address, protocol type, and IP.Length field. In some implementations, a packet classifier circuit of the computing system may read the IP.Length field or otherwise determine a size of the packet.

At 709, based on the determined size of the packet, the classifier circuit may determine a packet size group of the packet. For example, the classifier circuit may associate the packet with a particular packet size group based on a size of the packet. The particular packet size group may be one of a number of packet size groups. Determining a packet size group of a packet may comprise determining the size of the packet matches one of a plurality of packet sizes as determined based on application data such as described above. For example, each packet size group may be associated with a different packet size based on application data received as described above in method 600. In some implementations, determining a packet size group of a packet may comprise determining the size of the packet is near one of a plurality of packet sizes as determined based on application data such as described above. In some implementations, determining a packet size group of a packet may comprise determining the size of the packet is within a range of a plurality of packet size ranges as determined based on application data such as described above.

In some implementations, the classifier circuit may be configured to append packets with one or more bits or flags identifying the determined packet size group. In this way, the classifier circuit may classify or categorize received packets based on a size of each packet.

At 712, using an arbiter for the packet size group of the packet, a port from which to send the packet may be determined. Determining a port from which to send the packet may include associating the packet with one of a plurality of routing circuits, such as arbiter circuits, based on the determined size of the packet.

In some cases, as described above, the packet may be appended with one or more bits or flags identifying the packet size group of the packet. In such cases, arbiter circuits may automatically route each packet with a bit representing a packet size group with which each respective arbiter circuit is associated. For example, a first arbiter circuit may be configured to route packets in a first packet size group. The first packet size group may be associated with a flag of 01. The first arbiter circuit may identify any packet with a flag of 01 and assign such a packet to a particular port.

Determining the port from which to send the packet may include an arbiter circuit executing a round-robin mechanism. To execute a round-robin mechanism, each arbiter circuit may maintain a list or array of egress ports which may be used to send packets as well as a pointer, such as in the form of a counter or an index. The pointer may initially point to a first port in the list or array of egress ports, while in some implementations the pointer may initially point to a random port or otherwise point to one port of the egress ports. When a packet arrives and is assigned to an arbiter circuit by a classifier circuit, the assigned arbiter may consult the pointer to decide to which port the packet should be directed.

Once a packet is assigned to a port based on the current position of the pointer, the pointer may advance to a next port in the sequence. If the pointer reaches the last port, the pointer may wrap back around to the first port, ensuring a cyclical, round-robin pattern. By using this cyclic pattern, each arbiter circuit may ensure that every available egress port gets an equal number of packets over time. This prevents any single port from being overwhelmed with too many packets or, conversely, being underutilized.

Because each arbiter circuit handles packets of a particular size, large packets will be equally spread across the available ports, as will packets of other sizes. As a result, no one port will be overwhelmed by an excessive number of large packets and no port will be underutilized by being assigned an excessive number of small packets.

Using the round-robin mechanism or otherwise, each arbiter, when assigned a packet, may select a port for transmitting the packet and at 715, the packet may be sent from the computing system via the selected port.

The method 700 may be repeated for any packet to be sent from the computing system. As should be appreciated, the method 700 may be repeated on a continual basis and certain steps of the method 700 may occur simultaneously in a parallelized fashion.

The present disclosure encompasses methods with fewer than all of the steps identified in FIGS. 6 and 7 (and the corresponding description of the methods), as well as methods that include additional steps beyond those identified in FIGS. 6 and 7 (and the corresponding description of the methods). The present disclosure also encompasses methods that comprise one or more steps from the methods described herein, and one or more steps from any other method described herein.

Embodiments of the present disclosure include a system comprising one or more circuits to: receive a packet; determine a size of the packet; determine a group of a plurality of groups of the packet based on the size of the packet; determine a port for the packet using a round-robin for the group of the packet; and send the packet via the port.

Embodiments also include a system including one or more circuits to: receive a plurality of packet sizes from an application; initialize a plurality of packet arbiter circuits, wherein each packet arbiter circuit is associated with one of the plurality of packet sizes; receive a first packet associated with the application; determine a size of the packet; based on the determined size of the packet, associate the packet with one of the packet arbiter circuits; select, with the associated packet arbiter circuit, a port of a plurality of ports; and route the packet to the selected port of the plurality of ports.

Embodiments also include a switch comprising one or more circuits to: receive a packet; match a size of the packet to a packet size category; based on the packet size category matching the size of the packet, determine a port for the packet using a round-robin associated with the packet size category of the packet; and send the packet via the port.

Aspects of the above systems and switch include wherein the one or more circuits are further to: receive application data from application; and create the plurality of groups based on the application data.

Aspects of the above systems and switch include wherein the packet is received from the application.

Aspects of the above systems and switch include wherein the application data comprises a set of packet sizes.

Aspects of the above systems and switch include wherein creating the plurality of groups comprises creating a group for each packet size of the set of packet sizes.

Aspects of the above systems and switch include wherein determining the group of the packet comprises determining the size of the packet matches one of the plurality of packet sizes from the application.

Aspects of the above systems and switch include wherein the one or more circuits are further to initiate a round-robin for each group of the plurality of groups.

Aspects of the above systems and switches include wherein the one or more circuits comprise a plurality of routing circuits, wherein each routing circuit is associated with a respective one of the groups.

Aspects of the above systems and switch include wherein determining the size of the packet comprises reading a field of the packet.

Aspects of the above systems and switch include wherein the one or more circuits are further to append the packet with one or more bits identifying the group of the packet.

Aspects of the above systems and switch include wherein initializing the plurality of packet arbiter circuits comprises setting a start point for each of the packet arbiter circuits.

Aspects of the above systems and switch include wherein the start point for each of the packet arbiter circuits is set randomly or with a linear feedback shift register (LFSR).

Aspects of the above systems and switch include wherein determining the size of the packet comprises determining the size of the packet matches one of the plurality of packet sizes from the application.

Aspects of the above systems and switch include wherein determining the size of the packet comprises reading a field of the packet.

Aspects of the above systems and switch include wherein the one or more circuits are further to: receive a plurality of packets; determine a size of each of the packets; based on the determined size of each of the packets, associate each of the packets with one of the packet arbiter circuits; select, with the associated packet arbiter circuit, a port of a plurality of ports for each of the packets; and route each of the packets to the selected port of the plurality of ports for each of the packets.

Aspects of the above systems and switch include wherein the packet size category is one of a plurality of packet size categories and the one or more circuits are further to: receive application data from application; and create the plurality of packet size categories based on the application data.

Aspects of the above systems and switch include wherein the packet is received from the application.

Aspects of the above systems and switch include wherein the application data comprises a set of packet sizes.

It is to be appreciated that any feature described herein can be claimed in combination with any other feature(s) as described herein, regardless of whether the features come from the same described embodiment.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system comprising one or more circuits to:
receive a packet;
determine a size of the packet;
determine a group of a plurality of groups based on the size of the packet, wherein each group of the plurality of groups is associated with a respective packet size, and wherein each group of the plurality of groups is associated with a respective round-robin circuit of a plurality of round-robin circuits, wherein each round-robin circuit of the plurality of round-robin circuits is configured to distribute packets of a respective size or range of sizes between queues of a group of queues;
select a queue from a group of queues using the round-robin circuit associated with the group determined based on the size of the packet; and
in response to selecting the queue using the round-robin circuit associated with the group determined based on the size of the packet, send the packet to the selected queue.

2. The system of claim 1, wherein the one or more circuits are further to:
receive application data from an application; and
create the plurality of groups based on the application data.

3. The system of claim 2, wherein the packet is received from the application.

4. The system of claim 2, wherein the application data comprises a set of packet sizes.

5. The system of claim 4, wherein creating the plurality of groups comprises creating a group for each packet size of the set of packet sizes.

6. The system of claim 4, wherein determining the group of the plurality of groups comprises determining the size of the packet matches one packet size of the set of packet sizes.

7. The system of claim 1, wherein the one or more circuits are further to initiate the respective round-robin circuit for each group of the plurality of groups.

8. The system of claim 1, wherein determining the size of the packet comprises reading a field of the packet.

9. The system of claim 1, wherein the one or more circuits are further to append the packet with one or more bits identifying the group of the packet.

10. A system comprising one or more circuits to:

receive a plurality of packet sizes from an application;

initialize a plurality of round-robin circuits, wherein each round-robin circuit is associated with one of the plurality of packet sizes, wherein each round-robin circuit is configured to distribute packets of a respective size or range of sizes between queues of a group of queues;

receive a packet associated with the application;

determine a size of the packet;

based on the determined size of the packet, select one of the round-robin circuits;

select, with the associated round-robin circuit, a queue of a plurality of queues; and in response to selecting the queue using the round-robin circuit selected based on the determined size of the packet, send the packet to the selected queue of the plurality of queues.

11. The system of claim 10, wherein initializing the plurality of round-robin circuits comprises setting a start point for each of the round-robin circuits.

12. The system of claim 11, wherein the start point for each of the round-robin circuits is set randomly or with a linear feedback shift register (LFSR).

13. The system of claim 10, wherein determining the size of the packet comprises determining the size of the packet matches one of the plurality of packet sizes from the application.

14. The system of claim 10, wherein determining the size of the packet comprises reading a field of the packet.

15. The system of claim 10, wherein the one or more circuits are further to:

receive a plurality of packets; and for each packet of the plurality of packets:

determine a size of the respective packet;

based on the determined size of the respective packet, associate the respective packet with one round-robin circuit of the plurality of round-robin circuits;

select, with the selected round-robin circuit, a respective queue of the plurality of queues for the respective packet; and send the respective to the selected queue.

16. A switch comprising one or more circuits to:

receive a packet;

determine a size of the packet;

identify a packet size range including the size of the packet;

based on the identified packet size range, select a queue for the packet using a round-robin circuit associated with the identified packet size range, wherein the round-robin circuit associated with the identified packet size range is one of a plurality of round-robin circuits, wherein each round-robin circuit is associated with a respective packet size range, and wherein each round-robin circuit is configured to distribute packets of a respective range of sizes between queues of a group of queues; and in response to selecting the queue using the round-robin circuit associated with the identified packet size range including the size of the packet, send the packet to the queue.

17. The switch of claim 16, wherein the packet size range is one of a plurality of packet size ranges and the one or more circuits are further to:

receive application data from an application; and create the plurality of packet size ranges based on the application data.

18. The switch of claim 17, wherein the packet is received from the application.

19. The switch of claim 17, wherein the application data comprises a set of packet sizes.

20. The switch of claim 19, wherein the one or more circuits are further to initiate a respective round-robin circuit of the plurality of round-robin circuits for each packet size of the set of packet sizes.

* * * * *